March 1, 1960

U. P. TRUDEAU 2,926,457

APPARATUS FOR DELIVERING MOLD CHARGES TO A FORMING MACHINE

Filed June 28, 1954

INVENTOR
URBAN P. TRUDEAU

BY
Rule and Hoge
ATTORNEYS.

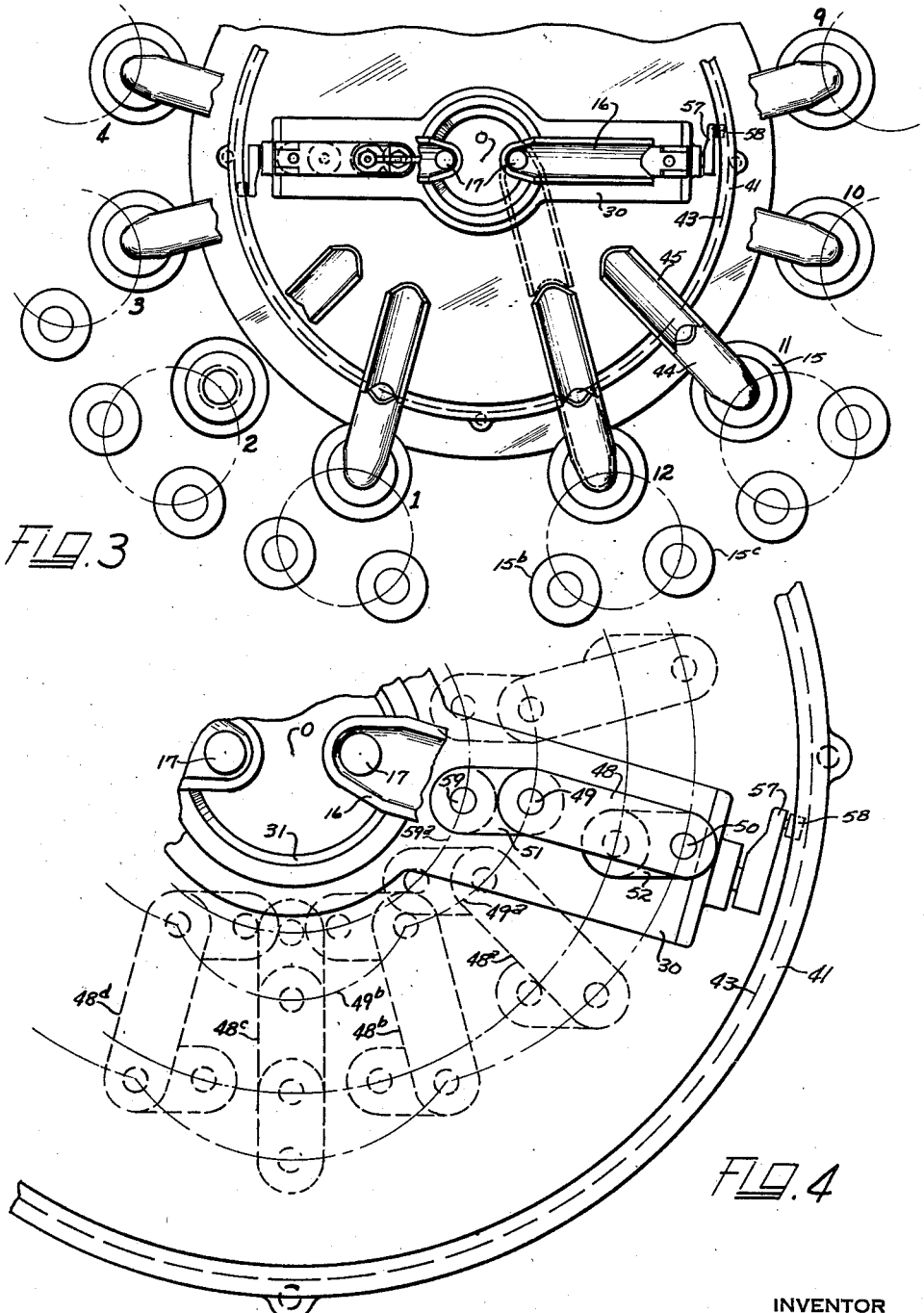

United States Patent Office 2,926,457
Patented Mar. 1, 1960

2,926,457
APPARATUS FOR DELIVERING MOLD CHARGES TO A FORMING MACHINE

Urban P. Trudeau, Toledo, Ohio, assignor to Owens-Illinois Glass Company, a corporation of Ohio Application June 28, 1954, Serial No. 439,701

3 Claims. (Cl. 49—5)

My invention relates to apparatus for use in the manufacture of molded ware from molten or plastic material, and particularly to apparatus for transferring mold charges of the material from a feeder to the forming molds. The invention is herein illustrated as adapted for transferring mold charges or gobs of molten glass from a furnace forehearth or feeder to the stationary molds of forming machines or molding units. The invention provides a continuously rotating chute system by which the mold charges or gobs as delivered from the feeder are guided and directed into chutes which rotate about the axes of the discharge orifices of the feeder. The gobs are distributed by the rotating chutes to stationary troughs through which they are guided to the molds.

The apparatus is herein illustrated and described as employed for supplying mold charges of molten glass to machines for molding hollow glass articles such as bottles, jars and tumblers, although not limited to such use. At the present time glass molding machines of this type are being developed which require the delivery of mold charges to the molds at a more rapid rate than they can be supplied by standard commercial feeders which deliver the glass through a single orifice. An object of the present invention is to provide an apparatus in which the gob feeder is provided with a plurality of orifices through which the charges of glass are simultaneously discharged to a corresponding number of gob delivery systems or units for supplying the mold charges to the forming machine or forming units at the required rapid rate.

A rotary gob delivery system is not directly applicable to a feeder with two or more delivery orifices placed side by side, particularly as the rotating chutes would interfere with each other. Separate chute systems must be used, as gobs from each orifice are being sheared simultaneously from the supply body. The present invention provides a novel method and construction wherein a separate gob delivery system is associated with each discharge orifice, each system comprising a chute having its upper receiving end in vertical register with the orifice, the chute being downwardly and outwardly curved or inclined, and rotatable about the vertical axis of the orifice, thereby directing and discharging the gobs in succession. The gobs as they are discharged from the rotating chutes may be guided through stationary troughs to a series of molds.

In order to prevent interference between the rotating chute systems, the construction provides means by which each chute at predetermined points during its rotation is automatically shifted from its register with one feeder orifice to the other, both the chutes being shifted simultaneously and thereby exchanging positions. In this manner interference is prevented. The arrangement is such that all the mold charges for one forming machine or group of molds are supplied from the same feeder outlet, while a second group of molds is supplied with the mold charges from the other outlet.

Referring to the accompanying drawings which illustrate an apparatus for practicing my invention:

Fig. 3 is a partly diagrammatic plan view with parts broken away showing the system of gob chutes; and Fig. 4 is a fragmentary plan view on a larger scale showing particularly the linkage controlling the positions of the chutes.

Figure 1:
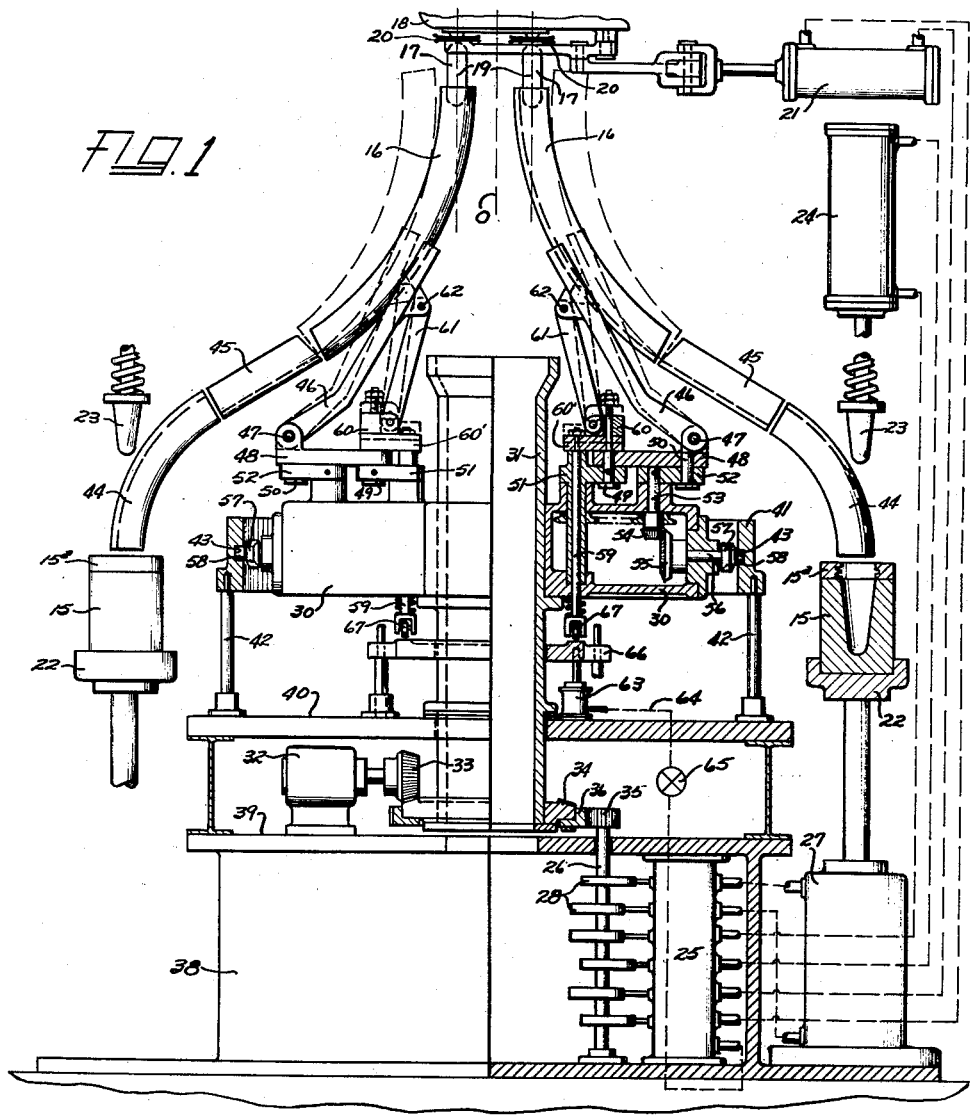
Fig. 1 is a part sectional elevational view of the apparatus.

Referring to the drawings, the feeder apparatus is adapted for supplying mold charges to stationary parison molds 15 arranged in an annular series concentric with or surrounding the vertical axis O about which the carriage for the gob transfer chutes 16 is rotated. The mold charges 17, consisting of preformed gobs of molten or plastic glass, are supplied from a feeder 18 which may be of well-known construction except as modified to provide for duplex gob feeding. The mold charges are formed and delivered through a pair of outlet openings in the floor of the forehearth, the points of discharge of the mold charges from the forehearth being at said openings, two gobs or charges being simultaneously severed from the supply body of molten glass by shears 20 operated by a piston motor 21. The series of stationary blank or parison molds 15 surrounding the transfer mechanism may comprise two groups of molds or mold units, each group having all of its mold charges supplied from a single feeder outlet as hereinafter described. The molds are supported on pads 22 attached to the piston rods of piston motors 27 by which the molds are lifted and lowered. Neck mold plungers 23 are projected downwardly into the molds for forming the parisons, by piston motors 24. The piston motors may be operated by air under pressure under the control of a timer 25 including the cam shaft 26 with cams 28 thereon for actuating the timer control valves. Each parison mold 15 includes a neck ring 15$^a$ in which the neck of the article is molded and by which the article is transferred to an intermediate station 15$^b$ (Fig. 3) and a take-out station 15$^c$.

The gob delivery apparatus for receiving the gobs from the feeder and delivering them to the molds comprises two separate systems which may be of identical construction, mounted and arranged at diametrically opposite positions on a carriage 30. The carriage is mounted on a center column 31 which is rotated continuously about a vertical axis O by a motor 32 which operates through gears 33 and 34, the latter fixed to the column 31. The cam shaft 26 is continuously driven through gears 35 and 36, the latter connected to the gear 34. The motor 32 is mounted on a framework comprising a base 38, a lower platform 39 and an upper platform 40.

A stationary cam 41 which surrounds the carriage, is mounted on posts 42 rising from the platform 40. The cam is formed with a continuous cam track 43 which controls the positions of the chutes 16, maintaining their upper ends in register with the feeder outlets as hereinafter described. Each of the two chutes 16 as it rotates has its lower end brought into register with stationary channels or guides individual to the molds 15. Each channel includes a lower section or chute 44 and an intermediate stationary trough section 45 positioned between the chute 44 and the path of the rotating chutes 16.

Each of the chutes 16 is fixed to and carried on an arm 46 connected by a horizontal pivot pin 47 to a carrier plate 48. The plate 48 and arm 46 are movable horizontally relative to the carriage under the control of the cam track 43 operable through intermediate mechanism for shifting the chute 16 horizontally as the carriage rotates. The operating connections between the arm 46 and the cam include the plate 48 which is connected by pivot pins 49 and 50 to parallel links 51 and 52. The link 52 is keyed to a vertical shaft 53 journaled in the carriage 30. The shaft 53 carries a miter pinion 54 running in mesh with a gear 55 on a shaft 56 journaled in the carriage frame 30. The shaft 56 carries a crank arm 57, the free end of which is provided with a cam follower roll 58 running in the cam track 43. The link 51 is pivoted to swing about a vertical rod 59 mounted for up-and-down movement in the carriage frame 30.

Each of the rods 59 is connected at its upper end to a plate 60' on which is seated a head 60. The pivot pin 49 extends upwardly through aligned openings in the plate 60' and head 60. A link 61 is pivoted at its lower end to the head 60 and at its upper end is connected by a pivot 62 to the arm 46. The rods 59 are adapted to be moved upwardly for swinging the arm 46 and funnels 16 outwardly to the broken line position (Fig. 1) when it is desired to withdraw the funnels out of register with the feeder. The rods 59 are moved upwardly by means of an air motor or motors 63 which receive air pressure through a line 64 extending to the distributor 25. The line may be closed by a valve 65. The motors 63 operate to lift a plate 66 mounted for vertical movement and thereby move the rods 59 upwardly. The plate 66 when lifted provides a track for rolls 67 on the rods 59.

The operation is as follows:

The carriage 30 is rotated continuously about its axis by the motor 32 and carries with it the funnel guides or chutes 16. The upper ends of the chutes are maintained in register with the gob feeder openings and rotate about the vertical axes 19 of said openings. The lower ends of the chutes 16 are thus brought into register with the stationary chutes 44, 45 in rapid succession. The air motors 21, 24 and 27, under the control of the timer 25, are operated in synchronism with the movements of the gob chutes. The operation of the shears 20 is so timed that the gobs 17 are delivered to the trough sections 45 at the instant the chutes 16 register therewith.

Each of the rotating chutes 16 has its upper end maintained in register with an outlet orifice by means of the stationary cam 43 operating through the parallel linkage comprising the plate 48 and links 51, 52. It will be observed that the distance between the axis O and the axis 19 of each outlet orifice is equal to the length of the links 51, 52 as measured between their pivot points. The inner ends of the links 51, pivoted on the rods 59, travel in a circle 59$^a$ concentric with the axis O. As the axis 19 of each outlet orifice is spaced laterally from the axis O the pivots 59 during their travel about the axis O (in the circle 59$^a$), gradually approach the axis 19 and then recede therefrom. Each pivot 49, however, is maintained at a constant distance from the nearest outlet axis 19 by means of its swinging movement about the pivot 59. This movement for maintaining a constant distance between the outlet and pivot 49 is effected and controlled by the stationary cam track 43. The path of the pivot 49 is indicated on Fig. 4 by the curved line 49$^a$ and the path of the pivot 59 by the circle 59$^a$.

Assuming that the carriage is rotating in a clockwise direction, the supporting plate 48 for a chute 16 is carried to the full line position (Fig. 4) and the broken line positions 48$^a$, 48$^b$, 48$^c$ and 48$^d$ in succession. During a portion of this movement the pivot 49 is gradually moved inwardly toward the path 59$^a$ of the pivot 59 but is maintained at a constant distance from the orifice axis 19 as shown by the line 49$^a$ concentric with the axis 19. In this manner the upper end of the chute 16 is maintained in register with the outlet orifice.

Figure 2:
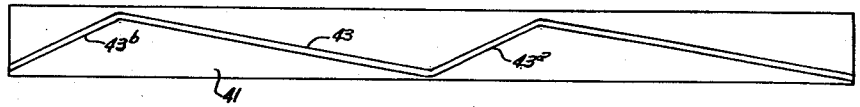
Fig. 2 is a development of the continuous cam track controlling the position of the rotating gob chutes.

The apparatus as herein shown is designed for supplying mold charges to 12 stations surrounding the feeder carriage. The several stations at which the molds 15 are located may be numbered 1 to 12 inclusive. During the passage of a chute 16 from station 12 to station 1 (Fig. 3), the upper end of the chute is automatically shifted from one orifice axis 19 to the other. This shifting movement is effected by a sharply inclined cam section 43$^a$ (Fig. 2) of the cam track 43. The cam follower roll runs along this section during the movement of the chute from station 12 to station 1. The rotation of the shaft 56 during this travel of the cam follower roll is sufficient to rotate the parallel links 51, 52 through substantially 180° as indicated by the curved line 49$^b$ (Fig. 4) which shows the path of the pivot 49 at this time. It will be observed that by this movement the plate 48 which carries the chute 16 is shifted from the right-hand position 48$^b$ (with respect to its carrying links), in which it is registered with right-hand feeder outlet, to the left-hand position 48$^d$ in which it is registered with the other outlet. The chute 16 is again shifted but in the reverse direction after a travel of 180°. That is, two such shifting movements occur during each complete rotation of the carriage but at diametrically opposite positions as indicated by the cam section 43$^a$ and 43$^b$ (Fig. 2).

Each of the two chutes 16 is operated in the same manner, the shifting taking place simultaneously so that the receiving ends of the two chutes exchange positions. This avoids any interference between the two units. It also provides a means by which all the mold charges for each of the two groups of molds are supplied from the same feeder orifice, which is an obvious advantage. Each chute 16 delivers mold charges from one feeder outlet to one group of molds, and then delivers mold charges from the other outlet to the other group of molds.

Modifications may be resorted to within the spirit and scope of my invention.

I claim:

1. The combination with a molten glass feeding device having means defining a pair of separate gob discharge outlets formed in the bottom wall thereof in laterally spaced relation to each other, a rotatable carriage having a vertical axis, said axis being disposed intermediate said outlets, a pair of groups of stationary ware forming molds, said molds being disposed circumferentially in equi-spaced relation to each other and to the axis of said carriage, a pair of gob guides mounted on said carrigae for rotation therewith, each of said guides cooperating with the molds of one of said groups, each of said guides having one end disposed adjacent to one of said outlets and adapted to receive gobs of glass therefrom, means for simultaneously severing and delivering a pair of gobs of molten glass from said outlets to said gob guides, one gob to each of said guides, means for rotating said carriage and moving said guides in succession from mold to mold in equal timed relation, and means for shifting the receiving end of each of said guides from one of said discharge outlets to the other of said discharge outlets as the gob guides are moved from one group to the other whereby each of said groups is fed by the same discharge outlet.

2. The combination claimed in claim 1 in which the spacing between said groups differs dimensionally from the spacing between the molds of each group and said shifting means moves said guides from one group to the other group in a time interval equal to that required to move said guides from one to another of the molds in each group.

3. The combination claimed in claim 1, in which the upper end of each of said gob guides is arranged for rotation about the vertical axis of one of the delivery outlets and in which means are provided for maintaining said upper end of each gob guide in vertical alignment with one outlet during the shifting of said guides from one of said molds to another of said molds in the same group.

References Cited in the file of this patent

UNITED STATES PATENTS

| | | |
|---|---|---|
| 2,131,241 | Wadsworth | Sept. 27, 1938 |
| 2,507,753 | Blackhurst | May 16, 1950 |
| 2,637,429 | Pond | May 5, 1953 |
| 2,669,805 | Rowe | Feb. 23, 1954 |